(12) United States Patent
Shiraishi

(10) Patent No.: US 12,066,066 B2
(45) Date of Patent: Aug. 20, 2024

(54) VEHICULAR DISC BRAKE

(71) Applicant: NISSIN KOGYO CO., LTD., Tomi (JP)

(72) Inventor: Yosuke Shiraishi, Tomi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 307 days.

(21) Appl. No.: 17/055,449

(22) PCT Filed: Jun. 11, 2019

(86) PCT No.: PCT/JP2019/023057
§ 371 (c)(1),
(2) Date: Nov. 13, 2020

(87) PCT Pub. No.: WO2019/240117
PCT Pub. Date: Dec. 19, 2019

(65) Prior Publication Data
US 2021/0088090 A1    Mar. 25, 2021

(30) Foreign Application Priority Data

Jun. 15, 2018 (JP) ................... 2018-114221
Jun. 15, 2018 (JP) ................... 2018-114222
Jul. 20, 2018 (JP) ................... 2018-136738

(51) Int. Cl.
*F16D 65/02* (2006.01)
*F16D 55/226* (2006.01)
(Continued)

(52) U.S. Cl.
CPC ..... *F16D 55/2262* (2013.01); *F16D 65/0056* (2013.01); *F16D 65/0068* (2013.01);
(Continued)

(58) Field of Classification Search
CPC .... F16D 55/224; F16D 55/225; F16D 55/226; F16D 55/2262; F16D 65/0056;
(Continued)

(56) References Cited

U.S. PATENT DOCUMENTS 4,410,070 A * 10/1983 Hagiwara ........... F16D 65/0006
188/73.31
6,135,246 A * 10/2000 Gautier ................ F16D 55/227
188/73.39
(Continued)

FOREIGN PATENT DOCUMENTS

CN    107636341 A    1/2018
JP    5-27366 U    4/1993
(Continued)

OTHER PUBLICATIONS

The Extended European Search Report dated Feb. 10, 2022, issued in counterpart EP Application No. 19819182.7. (6 pages).
(Continued)

*Primary Examiner* — Christopher P Schwartz
(74) *Attorney, Agent, or Firm* — WHDA, LLP

(57) ABSTRACT

The vehicular disc brake comprises a caliper bracket 3, a caliper body 6 attached to the caliper bracket 3, and friction pads 7, 7 disposed on both sides of a disc rotor 2, and the caliper body 6 comprises an action part 6a provided with cylinder holes 6f, 6g through which a large-diameter piston 10 and a small-diameter piston 11 are inserted, and a bridge part 6c extending across the outer periphery of the disc rotor 2. Thinned parts 6n, 6p are provided respectively in positions corresponding to the pistons 10, 11 in a disc-radially inner wall 6i of the bridge part 6c. The volume of the thinned part 6b corresponding to the large-diameter piston 10 on the disc turn-out side when the vehicle is moving forward is less (Continued)

than the volume of the thinned part 6p corresponding to the small-diameter piston 11 on the disc turn-in side.

7 Claims, 8 Drawing Sheets

(51) Int. Cl.
*F16D 65/00* (2006.01)
*F16D 65/097* (2006.01)
*F16D 55/00* (2006.01)
*F16D 55/227* (2006.01)
*F16D 121/04* (2012.01)

(52) U.S. Cl.
CPC .. *F16D 65/0974* (2013.01); *F16D 2055/0008* (2013.01); *F16D 2055/0016* (2013.01); *F16D 55/227* (2013.01); *F16D 65/0087* (2013.01); *F16D 2121/04* (2013.01)

(58) Field of Classification Search
CPC ............. F16D 65/0068; F16D 65/0974; F16D 55/227; F16D 65/0087; F16D 2055/0008; F16D 2055/0016
USPC ........................... 188/72.1, 72.3, 72.4, 73.39
See application file for complete search history.

(56) References Cited

U.S. PATENT DOCUMENTS

| | | | |
|---|---|---|---|
| 2010/0193300 A1* | 8/2010 | Saito | F16D 55/226 188/72.4 |
| 2017/0356511 A1 | 12/2017 | Aonuma et al. | |

FOREIGN PATENT DOCUMENTS

| | | | | |
|---|---|---|---|---|
| JP | 10-9298 A | 1/1998 | | |
| JP | 2005-330978 A | 12/2005 | | |
| JP | 2013204657 A | * 10/2013 | ............. | F16D 65/02 |
| JP | 2017-80760 A | 5/2017 | | |
| TW | 201704655 A | 2/2017 | | |
| WO | WO-2016199880 A1 | * 12/2016 | ........... | F16D 55/227 |

OTHER PUBLICATIONS

Office Action dated Feb. 22, 2022, issued in counterpart CN Application No. 201980039951.0, with English Translation. (16 pages).
Office Action dated Apr. 29, 2022, issued in counterpart IN Application No. 202017050697, with English Translation. (6 pages).
International Search Report dated Aug. 20, 2019, issued in counterpart International Application No. PCT/JP2019/023057. (1 page).
Office Action dated Dec. 9, 2022, issued in counterpart EP application No. 19819182.7. (6 pages).
Office Action dated Sep. 2, 2022, issued in counterpart Indonesian application No. P00202009285. (3 pages).
Office Action dated Nov. 14, 2022, issued in counterpart TW application No. 108120742. (11 pages).
Office Action dated Mar. 14, 2023, issued in counterpart JP application No. 2020-525579, with English translation. (7 bages).

* cited by examiner

VEHICULAR DISC BRAKE

TECHNICAL FIELD

The present invention relates to a vehicular disc brake used in an automobile, a motorcycle, or the like and, more particularly, to a vehicular disc brake that suppresses uneven wear of friction pads.

BACKGROUND ART

There is a conventional vehicular disc brake that includes a caliper bracket mounted to a vehicle body fixedly, a caliper body attached to the caliper bracket, and friction pads disposed on both sides of the disc rotor, in which the caliper body is formed by connecting, via a bridge part, an action part that is disposed on one side of the disc rotor and has cylinder holes that accommodate a plurality of pistons with a reaction part that is disposed on the other side of the disc rotor and has a reaction force claw (see, for example, PTL 1).

CITATION LIST

Patent Literature

PTL 1: JP-A-2005-330978

SUMMARY OF INVENTION

Technical Problem

In the disc brake as disclosed in PTL 1 above, the action part and the reaction part are pushed back so as to get away from the disc rotor by a reaction force due to sliding contact between the disc rotor and the friction pads during braking in the caliper body, the disc-radially inner sides of the action part and the reaction part are opened and deformed like a trapezoidal shape with the bridge part as a fulcrum, and the amount of deformation differs between the disc turn-out side and the disc turn-in side, thereby easily inducing uneven wear of the friction pads.

Accordingly, an object of the invention is to provide a vehicular disc brake that makes the amount of deformation caused in the caliper body during braking when the disc-radially inner sides of the action part and the reaction part are opened with the bridge part as a fulcrum substantially identical between the disc turn-out side and the disc turn-in side and can suppress uneven wear of the friction pads.

Solution to Problem

To achieve the object described above, a vehicular disc brake according to the invention includes a caliper bracket mounted to a vehicle body fixedly, a caliper body attached to the caliper bracket, and friction pads disposed in both sides of a disc rotor, each of the friction pad having a lining and a back plate, wherein an ear piece formed on each of the friction pads is slidably supported by a pad guide groove extending in a disc shaft direction formed in the caliper bracket or the caliper body, and wherein the caliper body has an action part with a plurality of cylinder holes into which a plurality of pistons is inserted and a bridge part extending across an outer periphery of the disc rotor, in which thinned parts are provided in positions corresponding to the pistons in a disc-radially inner wall of the bridge part and a volume of one of the thinned parts on a disc turn-in side in forward movement of a vehicle is different from a volume of another of the thinned parts on a disc turn-out side.

In addition, preferably, one of the pistons that is disposed closest to the disc turn-out side in forward movement of the vehicle is formed to have a larger diameter than the other pistons and one of the thinned parts that corresponds to the one of the pistons that has the larger diameter and is disposed closest to the disc turn-out side has a smaller volume than the other thinned parts.

In addition, preferably, a central line in a disc peripheral direction of the lining is formed so as to be offset to the disc turn-out side with respect to a cylinder hole middle line that connects a center of the disc rotor to a middle point between a center of one of the cylinder holes into which the one of the pistons that has the larger diameter is inserted and a center of one of the cylinder holes into which another of the pistons disposed closest to the disc turn-in side in forward movement of the vehicle is inserted.

In addition, preferably, each of the friction pads has the ear piece on the disc turn-out side in forward movement of the vehicle and a suspension piece on the disc turn-in side, a hanger pin that extends in the disc shaft direction across the outer periphery of the disc rotor is inserted into the suspension piece, a pad spring having a pad resilient piece that extends to the disc turn-out side and makes contact with a disc-radially outer surface of the friction pad is provided on the disc turn-in side of the disc-radially inner wall of the bridge part, and the pad resilient piece is disposed in the one of the thinned parts on the disc turn-in side.

In addition, preferably, a disc turn-out side end part and a disc turn-in side end part in forward movement of the vehicle of the disc-radially inner wall of the bridge part project toward a disc-radially inner side beyond the disc-radially outer surface of the pad guide groove.

In addition, preferably, the disc-radially inner wall of the bridge part is formed to have a shape corresponding to a shape of the disc-radially outer surface of each of the friction pads.

In addition, preferably, each of the friction pads has the ear piece on the disc turn-out side in forward movement of the vehicle and the suspension piece on the disc turn-in side, the hanger pin that extends in the disc shaft direction across the outer periphery of the disc rotor is inserted into the suspension piece, and the disc turn-out side end part of the disc-radially inner wall of the bridge part is provided with a pad detachable groove that makes the friction pads slidable in a longitudinal direction of the friction pads with the hanger pin removed.

In addition, preferably, the pad detachable groove is formed in parallel to the disc-radially outer surface of the pad guide groove.

Advantageous Effects of Invention

In the vehicular disc brake according to the invention, by providing the thinned parts in positions corresponding to the pistons in the disc-radially inner wall of the bridge part and making the volume of the thinned part on the disc turn-in side in forward movement of the vehicle different from the volume of the thinned part on the disc turn-out side, the rigidity of the disc turn-in side is different from the rigidity of the disc turn-out side of the caliper body by making the volumes of the thinned parts different according to a reaction force applied during braking, so that the disc turn-in side and the disc turn-out side can be adjusted to have substantially the same amount of deformation during braking. This can suppress uneven wear of the friction pad.

In addition, since the disc turn-in side is drawn toward the disc rotor side during braking in the friction pads, when the piston on the disc turn-in side is formed to have a small diameter and the piston on the disc turn-out side is formed to have a large diameter so that the friction pads are pressed against the disc rotor evenly, the braking reaction force applied during braking from the large-diameter piston to the caliper body is larger than the braking reaction force applied from the small-diameter piston side to the caliper body. However, since the volume of the thinned part provided on the disc turn-out side is smaller than the volumes of the other thinned parts, the rigidity on the disc turn-out side of the caliper body is larger than the rigidity on the disc turn-in side, the amount of deformation caused in the caliper body during braking when the disc-radially inner sides of the action part and the reaction part are opened with the bridge part as a fulcrum can be substantially identical between the disc turn-out side and the disc turn-in side, and uneven wear of the friction pad can be prevented.

Furthermore, the central line in the disc peripheral direction of the lining is formed so as to be offset to the disc turn-out side with respect to the cylinder hole middle line that connects the center of the disc rotor to the middle point between the center of one of the cylinder holes into which the piston having the large diameter is inserted and the center of one of the cylinder holes into which the other piston disposed closest to the disc turn-in side in forward movement of the vehicle is inserted, so the pressing force from the large-diameter piston and the pressing force from the small-diameter piston can be applied to the entire friction pads as evenly as possible and uneven wear of the friction pad can be suppressed.

In addition, the friction pad has the ear piece on the disc turn-out side and the suspension piece on the disc turn-in side, the hanger pin that extends in the disc shaft direction across the outer periphery of the disc rotor is inserted into the suspension piece, the pad spring having the pad resilient piece is provided on the disc turn-in side of the disc-radially inner wall of the bridge part, and the pad resilient piece is disposed in the thinned part on the disc turn-in side, so the resilient force of the pad resilient piece can be obtained using the thinned part and the rattle of the friction pad can be successfully suppressed.

Furthermore, since the disc turn-out side end part and the disc turn-in side end part of the disc-radially inner wall of the bridge part project toward the disc-radially inner side beyond the disc-radially outer surface of the pad guide groove, the disc turn-out side end part and the disc turn-in side end part of the disc-radially inner wall of the bridge part can come close to the center of the disc and the rigidity of the caliper body can be improved.

In addition, since the disc-radially inner wall of the bridge part is formed to have a shape corresponding to the shape of the disc-radially outer surface of the friction pad, the entire disc-radially inner wall of the bridge part can come close to the center of the disc and the rigidity of the caliper body can be improved.

Furthermore, in a type that supports the friction pad via the ear piece provided on the disc turn-out side and the hanger pin inserted on the disc turn-in side, since the pad detachable groove is provided in the disc turn-out side end part of the disc-radially inner wall of the bridge part, by removing the hanger pin and sliding the friction pad in the longitudinal direction of the friction pad when the friction pad is replaced, the ear piece passes through the pad detachable groove and the friction pad can be removed successfully. In addition, since the pad detachable groove is formed in parallel to the disc-radially outer surface of the pad guide groove, the friction pad can be replaced easily.

DESCRIPTION OF EMBODIMENTS

Figure 1:
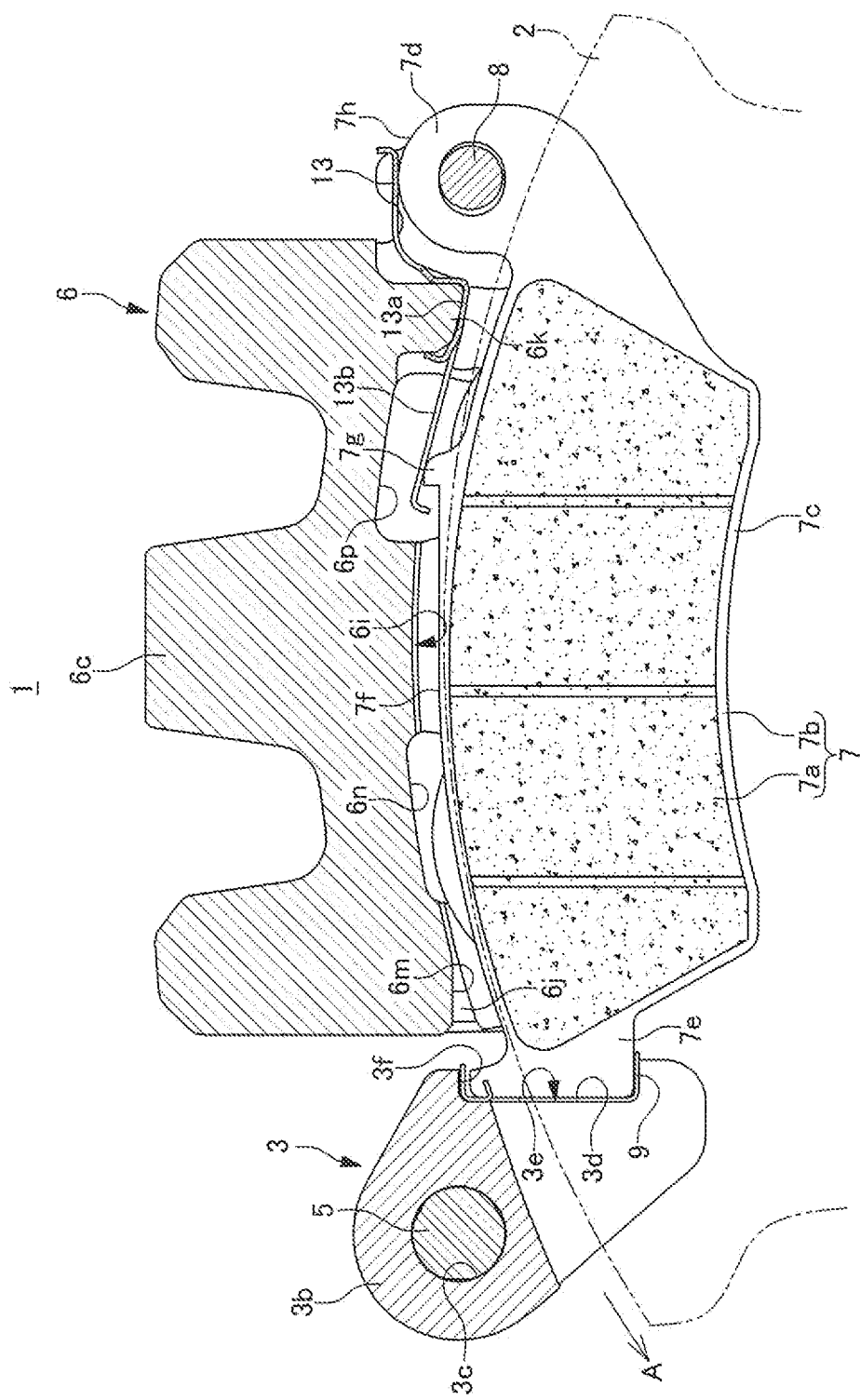
FIG. 1 is a sectional view taken along line I-I in FIG. 8.
Figure 2:
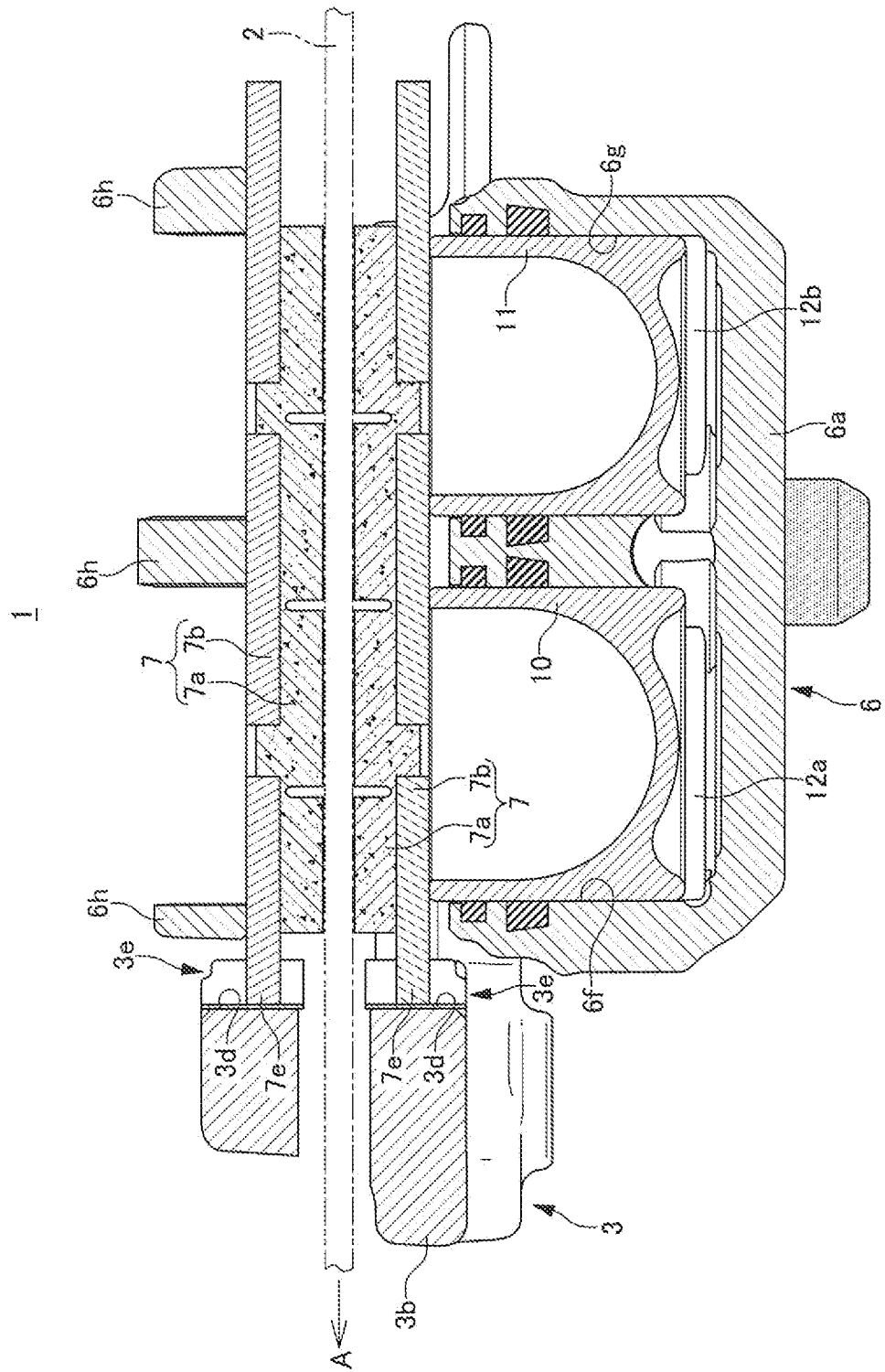
FIG. 2 is a sectional view taken along line II-II in FIG. 7.
Figure 3:
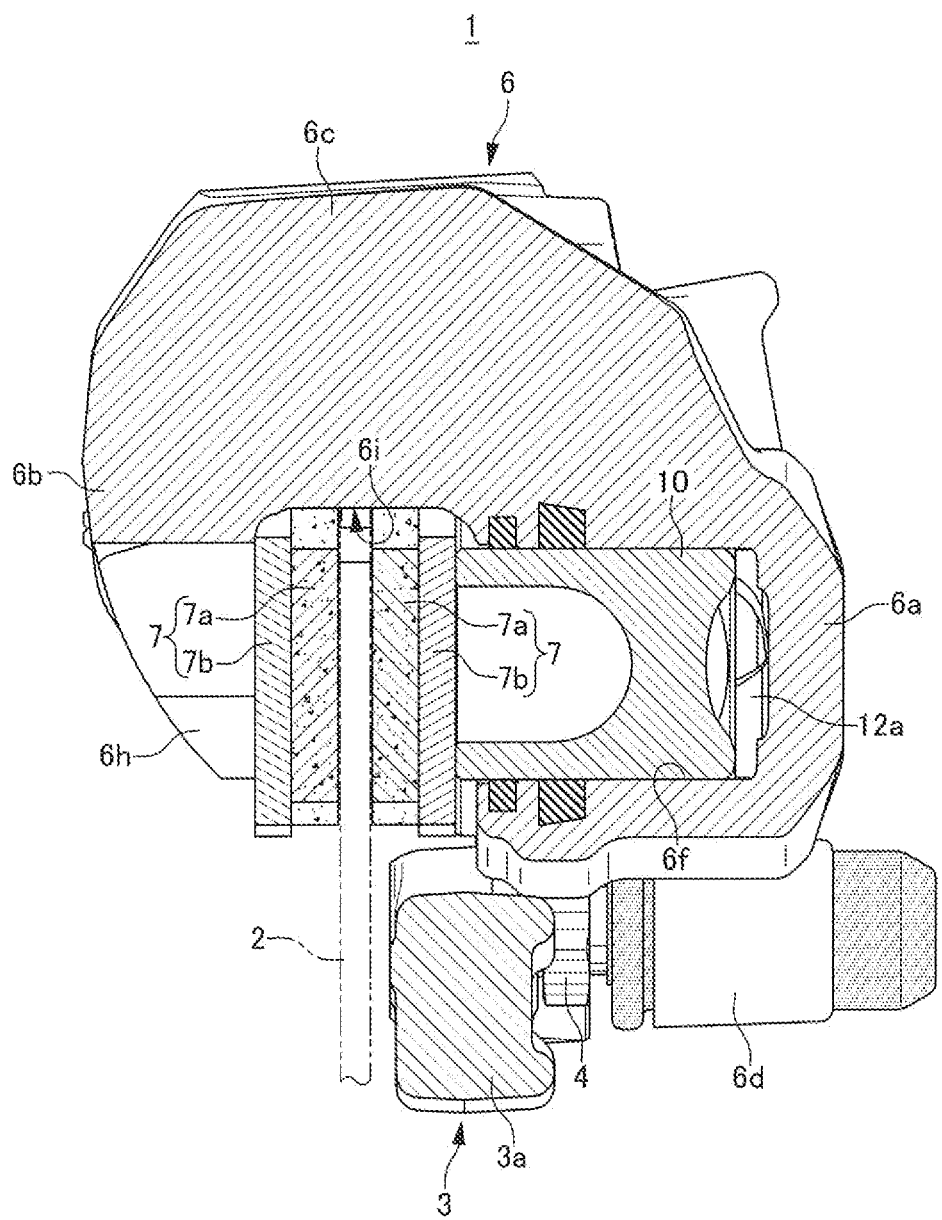
FIG. 3 is a sectional view taken along line III-III in FIG. 7.

FIG. 1 to FIG. 8 are diagrams illustrating a vehicular disc brake according to an embodiment of the invention. It should be noted here that arrow A indicates the rotational direction of a disc rotor rotating integrally with a wheel in forward movement of the vehicle and a disc turn-out side and a disc turn-in side described below assume forward movement of the vehicle.

A vehicular disc brake 1 includes a disc rotor 2 that rotates integrally with a wheel (not illustrated), a caliper bracket 3 mounted to a vehicle body fixedly on one side of the disc rotor 2, a pin slide type caliper body 6 supported via a pair of slide pins 4 and 5 slidably in a disc shaft direction, and a pair of friction pads 7 and 7 disposed on both sides of the disc rotor 2 so as to face each other.

The caliper bracket 3 includes a planar part 3a that is provided along one side of the disc rotor 2 and a pad support arm 3b that projects toward the other side across the outer side of the disc rotor 2 on the disc turn-out side of the caliper body 6. The one slide pin 4 is provided in a projecting manner on the disc turn-in side of the planar part 3a and a pin hole 3c into which the other slide pin 5 is inserted is bored in the pad support arm 3b. Furthermore, in the part of the pad support arm 3b close to the caliper body, a pair of pad guide grooves 3e and 3e that have torque reception surfaces 3d and extend in the disc shaft direction is provided with the disc rotor 2 sandwiched therebetween.

The friction pad 7 includes a lining 7a in slidable contact with the side surface of the disc rotor 2 and a back plate 7b held by the caliper bracket 3 and the caliper body 6. The back plate 7b is provided with a main body part 7c to which the lining 7a is pasted, a suspension piece 7d that projects from the disc turn-in side of the main body part 7c while being bent to the disc-radially outer side, and an ear piece 7e that projects from the disc turn-out side of the main body part 7c similarly, and the main body part 7c is bent along the outer shape of the disc rotor 2.

The caliper body 6 includes an action part 6a provided on one side of the disc rotor 2, a reaction part 6b provided on the other side of the disc rotor 2, and a bridge part 6c that couples these parts across the outer side of the disc rotor 2. Vehicle body mount arms 6d and 6d are provided in a projecting manner on the disc turn-in side and the disc-radially inner side of the action part 6a, the other slide pin 5 is provided in a projecting manner in the vehicle body mount arm 6d on the disc turn-in side, and the caliper body 6 is supported movably in the disc shaft direction by the caliper bracket 3 by inserting the other slide pin 5 into the pin hole 3c of the caliper bracket 3 and inserting the one slide pin 4 provided in a projecting manner in the planar part 3a into a pin accommodation hole (not illustrated) formed in the vehicle body mount arm 6d on the disc-radially inner side.

In addition, the action part 6a and the reaction part 6b are provided with hanger pin support arms 6e and 6e on the outside of the outer periphery of the disc rotor 2 so that the hanger pin support arms 6e and 6e project beyond the disc turn-in side surface of the bridge part 6c, a hanger pin 8 is provided between both the hanger pin support arms 6e and 6e in the disc shaft direction across the outer periphery of the disc rotor 2, and the friction pads 7 and 7 are suspended movably in the disc shaft direction with the disc rotor 2 sandwiched between the action part 6a and the reaction part 6b by inserting the hanger pin 8 into the suspension piece 7d and putting the ear pieces 7e in the pad guide groove 3e formed in the caliper bracket 3 via a retainer 9.

The action part 6a is provided with a large-diameter cylinder hole 6f on the disc turn-out side and a small-diameter cylinder hole 6g on the disc turn-in side with one ends of these holes close to the disc rotor 2 opened and the reaction part 6b is provided with three reaction force claws 6h, 6h, and 6h away from each other in the disc peripheral direction. A large-diameter piston 10 is movably accommodated in the large-diameter cylinder hole 6f and small-diameter piston 11 is movably accommodated in the small-diameter cylinder hole 6g and hydraulic chambers 12a and 12b are defined between the pistons 10 and 11 and the cylinder holes 6f and 6g, respectively.

In the bridge part 6c, a disc turn-out side end part 6j and a disc turn-in side end part 6k of a disc-radially inner wall 6i project toward the disc-radially inner side beyond a disc-radially outer surface 3f of a pad guide groove 3e, the disc-radially inner wall 6i is formed to have a curved surface corresponding to the shape of a disc-radially outer surface 7f of the back plate 7b. Accordingly, the disc-radially inner wall 6i of the bridge part 6c comes close to the disc-radially outer surface 7f of the back plate 7b. Furthermore, the disc turn-out side end part 6j of the bridge part 6c is provided with a pad detachable groove 6m that makes the friction pads 7 and 7 slidable in the longitudinal direction of the friction pads 7 with the hanger pin 8 removed, in parallel to the disc-radially outer surface 3f of the pad guide groove 3e.

In addition, thinned parts 6n and 6p are provided in positions corresponding to the pistons 10 and 11 in a disc-radially inner wall 6i of the bridge part 6c, the volume of the thinned part 6n provided so as to correspond to the large-diameter piston 10 is smaller than the volume of the thinned part 6p provided so as to correspond to the small-diameter piston 11, and the length dimension in the disc radial direction of the thinned part 6n is smaller than the length dimension in the disc radial direction of the thinned part 6p.

Furthermore, a pad spring 13 that makes contact with a projection 7g formed on the disc-radially outer surface 7f of the friction pad 7 and a disc-radially outer surface 7h of the suspension piece 7d and suppresses the rattle of the friction pad 7 is mounted to the disc turn-in side end part 6k of the disc-radially inner wall 6i of the bridge part 6c. Each of the friction pads 7 is suspended movably in the disc shaft direction with the disc rotor 2 sandwiched between the action part 6a and the reaction part 6b by inserting the hanger pin 8 into the suspension piece 7d and putting the ear piece 7e in the pad guide groove 3e formed in the caliper bracket 3 via a retainer 9, and this assembling disposes, in the thinned part 6p, the projection 7g formed on the friction pad 7 and a pad resilient piece 13b that extends to the disc turn-out side from an attachment part 13a of the pad spring 13 and makes contact with the projection 7g.

In the state in which the friction pad 7 is assembled as described above, as illustrated in FIG. 5 to FIG. 7, the friction pad 7 is formed so that a central line CL1 in the disc peripheral direction (longitudinal direction) of the lining 7a is offset to the disc turn-out side with respect to a cylinder hole middle line CL2 that connects a middle point P3 between a center P1 of the large-diameter cylinder hole 6f and a center P2 of the small-diameter cylinder hole 6g to a center P4 of the disc rotor 2. Here, the central line CL1 passes through a middle point P5 between a disc turn-in side end part D1 and a disc turn-out side end part D2 of the disc-radially outer end part of the lining 7a and extends in parallel to the cylinder hole middle line CL2.

In the vehicular disc brake 1 according to the embodiment formed as described above, when hydraulic fluid whose pressure has been raised during braking is supplied to the hydraulic chambers 12a and 12b, the pistons 10 and 11 are pressed and moved toward the cylinder hole opening, press and move the friction pad 7 on the action part side toward the disc rotor 2, and press the lining 7a of the friction pad 7 against one side surface of the disc rotor 2. A reaction force thereof moves the caliper body 6 toward the action part while being guided by the slide pins 4 and 5, and the reaction force claws 6h press and move the friction pad 7 on the reaction part side toward the disc rotor 2 and press the lining 7a of the friction pad 7 against the other side surface of the disc rotor 2.

By making the rigidity of the disc turn-in side different from the rigidity of the disc turn-out side by making the volumes of the thinned parts 6n and 6p different from each other according to the reaction force applied to the caliper body 6 at this time, the amounts of deformation of the disc turn-in side and the disc turn-out side caused in the caliper body 6 can be substantially identical to each other during braking. Specifically, although the disc turn-in side is drawn toward the disc rotor 2 during braking in the friction pads 7 and 7, the piston 11 on the disc rotor turn-in side has a smaller diameter than the piston 10 on the disc turn-out side in the embodiment, so the pressing force on the disc turn-in side is smaller than the pressing force on the disc turn-out side, the friction pads 7 and 7 can be brought into contact with the side surfaces of the disc rotor 2 evenly, thereby preventing uneven wear of the friction pads 7 and 7. Furthermore, in the caliper body 6, the action part 6a and the reaction part 6b are pushed back so as to get away from the disc rotor by a reaction force due to sliding contact between the disc rotor 2 and the friction pads 7 and 7, the disc-radially inner sides of the action part 6a and the reaction part 6b are apt to be opened and deformed like a trapezoidal shape with the bridge part 6c as a fulcrum. However, in the bridge part 6c, since the small-volume thinned part 6n is formed in a position in the disc-radially inner wall 6i corresponding to the large-diameter piston 10 and the large-volume thinned part 6p is formed in a position corresponding to the small-diameter piston 10 so as to make the rigidity of the bridge part 6c close to the large-diameter piston 10 to which a large reaction force is applied larger than the rigidity of the bridge part 6c close to the small-diameter piston 11, it is possible to make the amounts of deformation on the disc turn-in side and the disc turn-out side of the caliper body 6 substantially identical to each other, thereby suppressing uneven wear of the friction pads 7 and 7.

In addition, since the pad resilient piece 13b of the pad spring 13 mounted to the disc turn-in side end part 6k of the disc-radially inner wall 6i of the bridge part 6c is disposed in the thinned part 6p, the resilient force of the pad resilient piece 13b can be obtained by the thinned part 6p and the rattle of the friction pads can be suppressed successfully.

Furthermore, the piston 11 on the disc turn-in side is formed to have a small diameter and the piston 10 on the disc turn-out side is formed to have a large diameter to press the friction pad 7 against the disc rotor 2 evenly because the disc turn-in side is drawn toward the disc rotor during braking in the friction pad 7, and the pressing force from the large-diameter piston 10 and the pressing force from the small-diameter piston 11 can be applied to the entire lining 7a of the friction pad 7 as evenly as possible because the central line CL1 in the disc peripheral direction is offset to the disc turn-out side with respect to the cylinder hole middle line CL2 in the lining 7a and uneven wear of the friction pad 7 can be suppressed.

In addition, although the caliper body 6 is apt to be deformed like a trapezoidal shape with the bridge part 6c as a fulcrum during braking as described above, the disc turn-out side end part 6j and the disc turn-in side end part 6k project toward the disc-radially inner side beyond the disc-radially outer surface 3f of the pad guide groove 3e and the disc-radially inner wall 6i is formed to have a curved surface that corresponds to the shape of the disc-radially outer surface 7f of the back plate 7b in the bridge part 6c. Accordingly, the entire disc-radially inner wall 6i of the bridge part 6c comes close to the center of the disc and the rigidity of the caliper body 6 increases, thereby preventing the caliper body 6 from being deformed like a trapezoidal shape.

Figure 4:
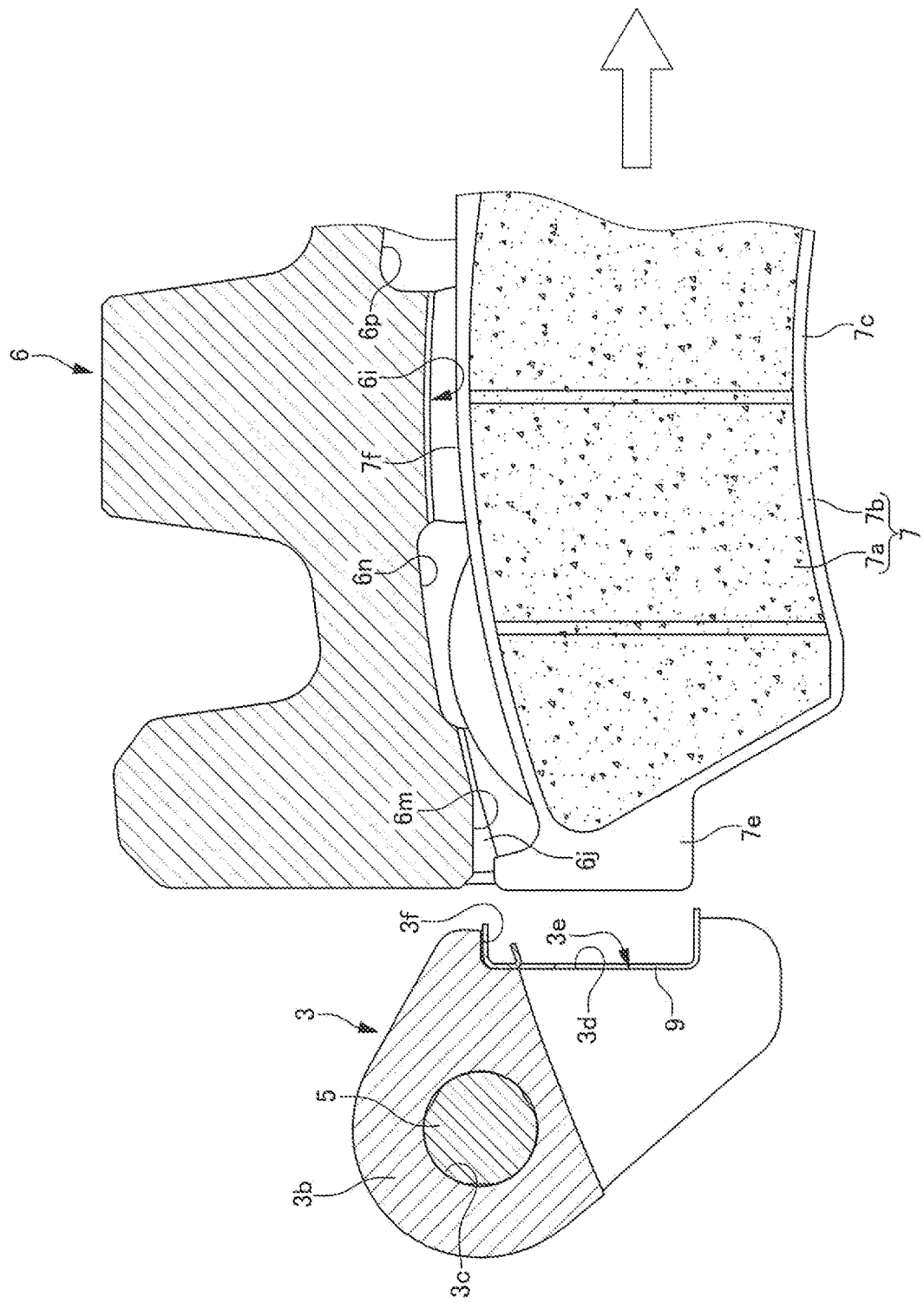
FIG. 4 is a main part explanatory diagram illustrating an embodiment of the invention.
Figure 5:
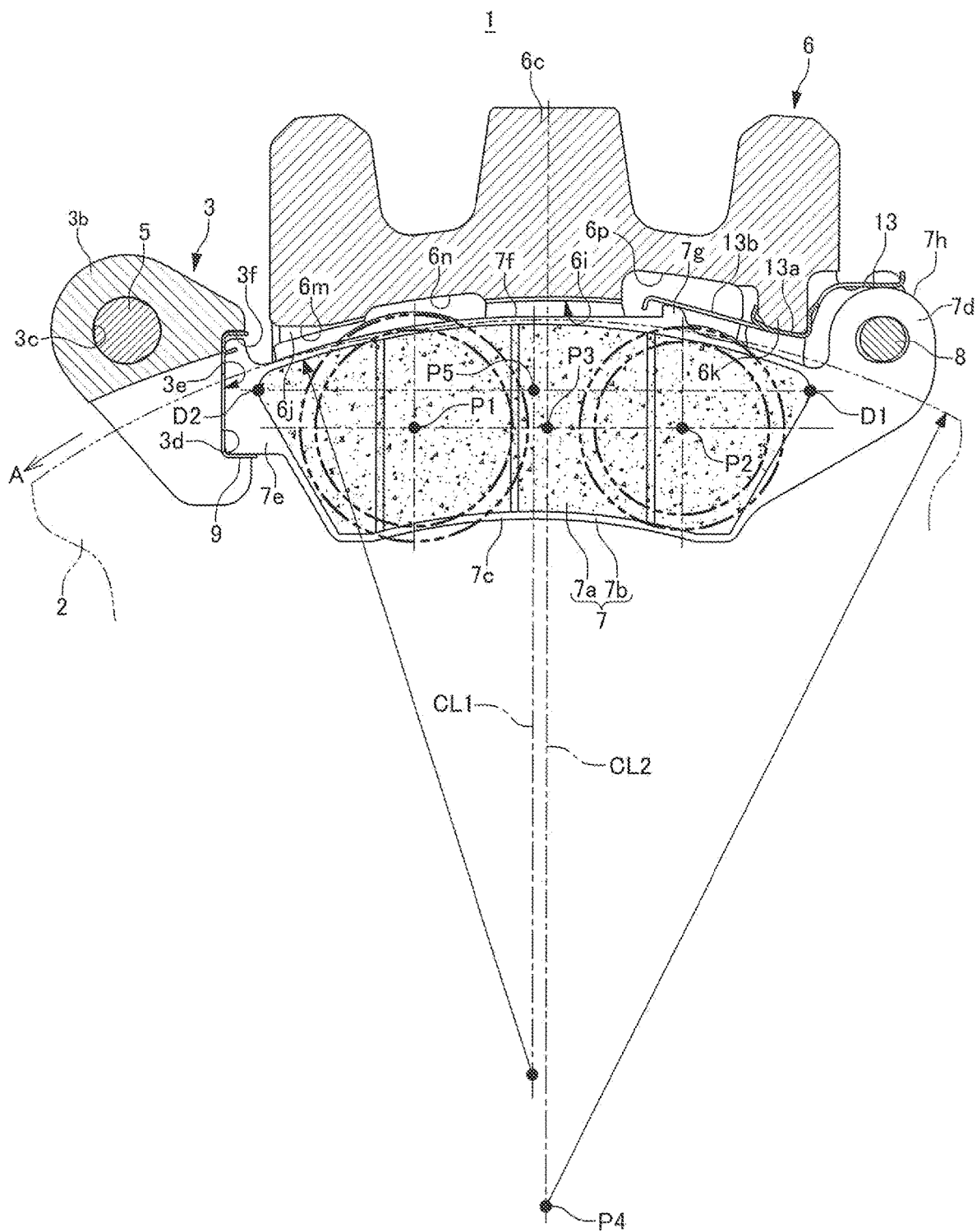
FIG. 5 is also a main part explanatory diagram.
Figure 6:
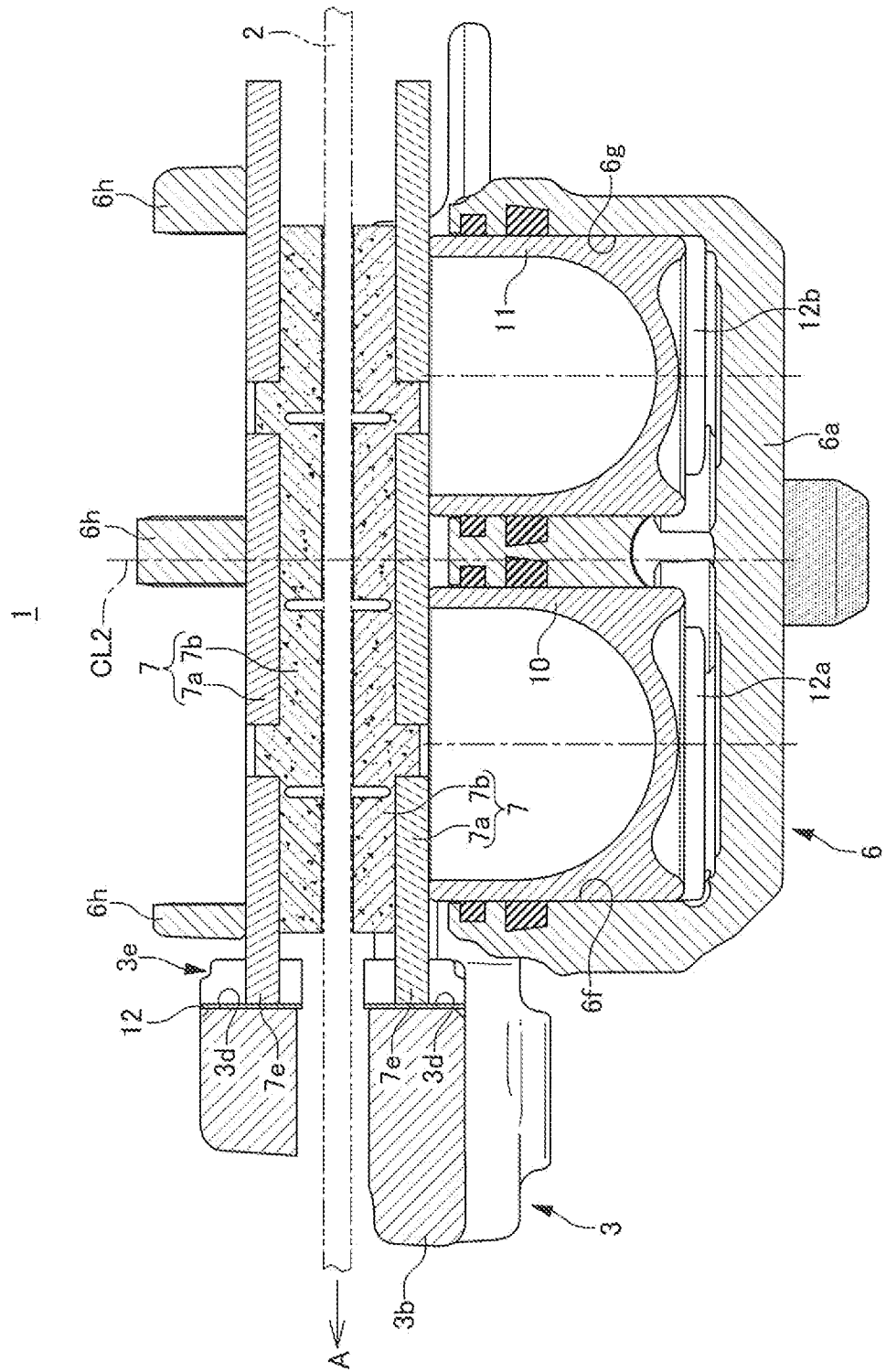
FIG. 6 is also a main part explanatory diagram.
Figure 7:
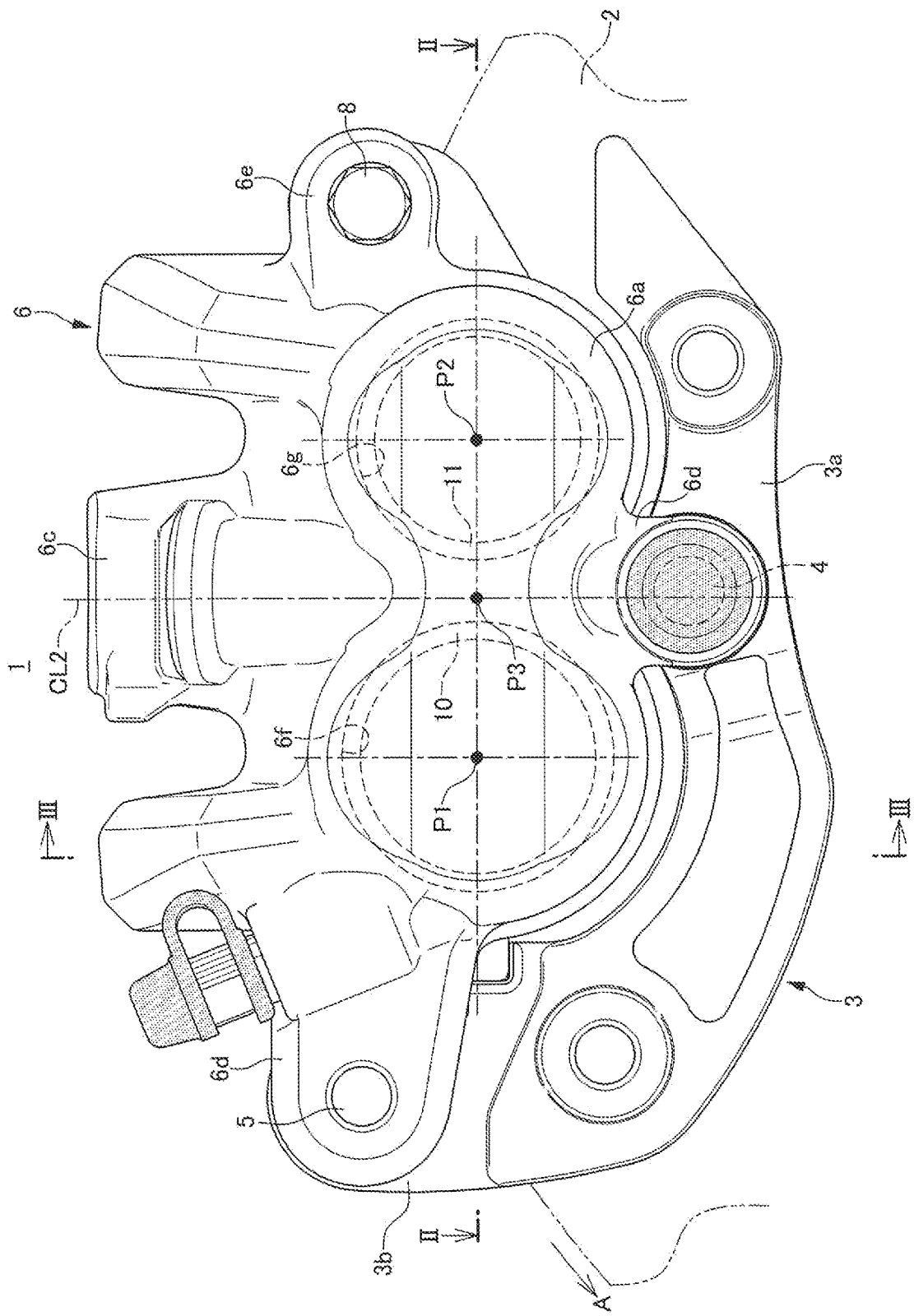
FIG. 7 is a front view illustrating a vehicular disc brake according to the embodiment of the invention.
Figure 8:
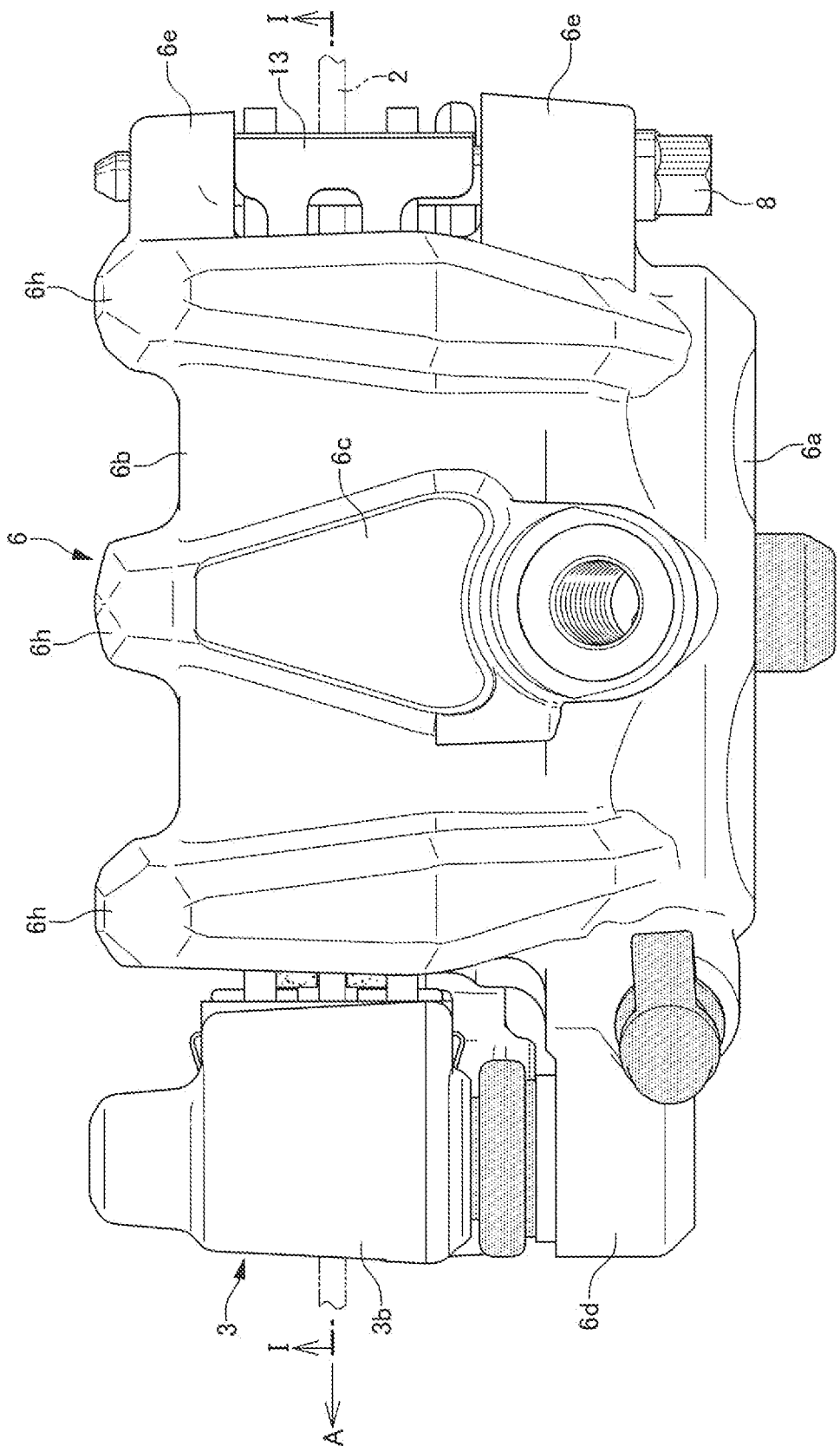
FIG. 8 is also a plan view illustrating the vehicular disc brake.

Furthermore, when the pads are replaced, by removing the hanger pin 8 and sliding the friction pad 7 to the disc turn-in side (in the longitudinal direction of the friction pad) as illustrated in FIG. 4, the friction pad 7 can be removed easily by passing the ear piece 7e through the pad detachable groove 6m. In addition, the friction pad 7 can be easily assembled by sliding the friction pad 7 from the disc turn-in side to the disc turn-out side (the longitudinal direction of the friction pad), passing the ear piece 7e through the pad detachable groove 6m and inserting the ear piece 7e into the pad guide groove 3e, and attaching the hanger pin 8 across the suspension piece 7d and the hanger pin support arms 6e and 6e of the caliper body 6.

As described above, the vehicular disc brake 1 according to the embodiment can suppress the deformation of the caliper body 6 during braking by increasing the rigidity of the caliper body 6 and allows the friction pads 7 and 7 to be replaced successfully.

It should be noted here that the invention is not limited to the embodiment described above and the action part and the reaction part of the caliper body can have any structures and the number of pistons and the diameters of pistons may have any values. In addition, the thinned parts formed in the bridge part may be formed in any positions and have any volumes appropriately according to the number of pistons and the diameters of pistons. In addition, the invention is applicable not only to a pin slide type disc brake, but also to a piston opposed type disc brake.

Furthermore, the barycenter of the caliper body is preferably disposed in the cylinder hole middle line. In addition, the barycenter of the lining is preferably present in the central line in the disc peripheral direction of the lining and the barycenter of the lining is preferably offset to the disc turn-out side with respect to the cylinder hole middle line.

REFERENCE SIGNS LIST

1: vehicular disc brake
2: disc rotor
3: caliper bracket
3a: planar part
3b: pad support arm
3c: pin hole
3d: torque reception surface
3e: pad guide groove
3f: disc-radially outer surface
4, 5: slide pin
6: caliper body
6a: action part
6b: reaction part
6c: bridge part
6d: vehicle body mount arm
6e: hanger pin support arm
6f, 6g: cylinder hole
6h: reaction force claw
6i: disc-radially inner wall
6j: disc turn-out side end part
6k: disc turn-in side end part
6m: pad detachable groove
6n, 6p: thinned part
7: friction pad
7a: lining
7b: back plate
7c: main body part
7d: suspension piece
7e: ear piece
7f: disc-radially outer surface
7g: projection
7h: disc-radially outer surface
8: hanger pin
9: retainer
10, 11: piston
12a, 12b: hydraulic chamber
13: pad spring
13a: attachment part
13b: pad resilient piece

The invention claimed is:

1. A vehicular disc brake comprising a caliper bracket mounted to a vehicle body fixedly, a caliper body attached to the caliper bracket, and friction pads disposed in both sides of a disc rotor, each of the friction pad having a lining and a back plate, wherein an ear piece formed on each of the friction pads is slidably supported by a pad guide groove extending in a disc shaft direction formed in the caliper bracket or the caliper body, and wherein the caliper body has an action part with a plurality of cylinder holes into which a plurality of pistons is inserted and a bridge part extending across an outer periphery of the disc rotor, wherein thinned parts are provided in positions corresponding to the pistons in a disc-radially inner wall of the bridge part and a volume of one of the thinned parts on a disc turn-in side in forward movement of a vehicle is different from a volume of another of the thinned parts on a disc turn-out side, wherein one of the pistons that is disposed closest to the disc turn-out side in forward movement of the vehicle is formed to have a larger diameter than the other pistons and one of the thinned parts that corresponds to the one of the pistons that has the larger diameter and is disposed closest to the disc turn-out side has a smaller volume than the other thinned parts, and wherein a central line in a disc peripheral direction of the lining is formed so as to be offset to the disc turn-out side with respect to a cylinder hole middle line that connects a center of the disc rotor to a middle point between a center of one of the cylinder holes into which the one of the pistons that has the larger diameter is inserted and a center of one of the cylinder holes into which another of the pistons disposed closest to the disc turn-in side in forward movement of the vehicle is inserted.

2. The vehicular disc brake according to claim 1, wherein a disc turn-out side end part and a disc turn-in side end part in forward movement of the vehicle of the disc-radially inner wall of the bridge part project toward a disc-radially inner side beyond a disc-radially outer surface of the pad guide groove.

3. The vehicular disc brake according to claim 2, wherein the disc-radially inner wall of the bridge part is formed to have a shape corresponding to a shape of the disc-radially outer surface of each of the friction pads.

4. The vehicular disc brake according to claim 1, wherein each of the friction pads has the ear piece on the disc turn-out side in forward movement of the vehicle and a suspension piece on the disc turn-in side, a hanger pin that extends in the disc shaft direction across the outer periphery of the disc rotor is inserted into the suspension piece, a pad spring having a pad resilient piece that extends to the disc turn-out side and makes contact with a disc-radially outer surface of the friction pad is provided on the disc turn-in side of the disc-radially inner wall of the bridge part, and the pad resilient piece is disposed in the one of the thinned parts on the disc turn-in side.

5. A vehicular disc brake comprising a caliper bracket mounted to a vehicle body fixedly, a caliper body attached to the caliper bracket, and friction pads disposed in both sides of a disc rotor, each of the friction pad having a lining and a back plate, wherein an ear piece formed on each of the friction pads is slidably supported by a pad guide groove extending in a disc shaft direction formed in the caliper bracket or the caliper body, and wherein the caliper body has an action part with a plurality of cylinder holes into which a plurality of pistons is inserted and a bridge part extending across an outer periphery of the disc rotor, wherein thinned parts are provided in positions corresponding to the pistons in a disc-radially inner wall of the bridge part and a volume of one of the thinned parts on a disc turn-in side in forward movement of a vehicle is different from a volume of another of the thinned parts on a disc turn-out side, wherein a disc turn-out side end part and a disc turn-in side end part in forward movement of the vehicle of the disc-radially inner wall of the bridge part project toward a disc-radially inner side beyond a disc-radially outer surface of the pad guide groove, and wherein each of the friction pads has the ear piece on the disc turn-out side in forward movement of the vehicle and the suspension piece on the disc turn-in side, the hanger pin that extends in the disc shaft direction across the outer periphery of the disc rotor is inserted into the suspension piece, and the disc turn-out side end part of the disc-radially inner wall of the bridge part is provided with a pad detachable groove that makes the friction pads slidable in a longitudinal direction of the friction pads with the hanger pin removed.

6. The vehicular disc brake according to claim 5, wherein the pad detachable groove is formed in parallel to the disc-radially outer surface of the pad guide groove.

7. The vehicular disc brake according to claim 5, wherein one of the pistons that is disposed closest to the disc turn-out side in forward movement of the vehicle is formed to have a larger diameter than the other pistons and one of the thinned parts that corresponds to the one of the pistons that has the larger diameter and is disposed closest to the disc turn-out side has a smaller volume than the other thinned parts.

* * * * *